United States Patent [19]
Dellinger et al.

[11] Patent Number: 5,431,979
[45] Date of Patent: Jul. 11, 1995

[54] CUT-RESISTANT TARPAULIN

[75] Inventors: Allan M. Dellinger, Waxhaw, N.C.; Michelle C. Carter, Madison, N.J.

[73] Assignee: Hoechst Celanese Corporation, Somerville, N.J.

[21] Appl. No.: 226,797

[22] Filed: Apr. 12, 1994

[51] Int. Cl.$^6$ .......................... B32B 3/00; B32B 7/08
[52] U.S. Cl. ...................................... 428/101; 428/57; 428/58; 428/61; 428/68; 428/74; 428/77; 428/102; 57/232; 57/233; 57/234; 57/237; 57/241; 57/243; 57/244; 57/250; 57/251
[58] Field of Search ................ 57/232, 233, 234, 237, 57/241, 243, 244, 250, 251; 428/57, 58, 61, 68, 74, 77, 101, 102

[56] References Cited
PUBLICATIONS

Samson Rope Manual No. 3–83, Samson Ocean Systems, Inc., Boston, Mass., 1982.
Dictionary of Fiber and Textile Technology, Hoechst Celanese Corporation, Charlotte, NC 1990, p. 88.
Corbman, B. P., Textiles: Fiber to Fabric, Sixth Edition, McGraw-Hill Inc., NYC, N.Y., 1983, pp. 94–95 & 144–145.
Fabric Science, Fairchild Publications Inc., NYC, N.Y., 1946, pp. 319, 343–344, 636, 638.

*Primary Examiner*—Patrick J. Ryan
*Assistant Examiner*—Rich Weisberger
*Attorney, Agent, or Firm*—R. H. Hammer, III

[57] ABSTRACT

A cut-resistant tarpaulin has a waterproof coating bonded to a cut-resistant woven fabric. The fabric has a leno or gauze weave. The fabric has warp yarns and weft yarns of braided fibers. The fibers have an initial modulus greater than 400 grams per denier.

6 Claims, 2 Drawing Sheets

CUT-RESISTANT TARPAULIN

FIELD OF THE INVENTION

This invention is directed to a cut-resistant tarpaulin.

BACKGROUND OF THE INVENTION

Tarpaulins are canvas-like coverings used to protect objects from, among other things, the weather. Tarpaulins have been used to cover objects carried on trucks. These tarpaulins, however, are deficient in protecting against pilferage because they are easily cut with knives or razors. Accordingly, there is a need to have a cut-resistant tarpaulin to deter pilferage.

An attempt to improve the cut-resistance of tarpaulins involved the following construction: a 1.4 mm, 8-end braid of 1500 denier VECTRAN® HS liquid crystalline polymer fiber was woven and then laminated, on both sides, with polyvinyl chloride (PVC) resin, so that the PVC resin saturated the woven fabric and thereby fixed in place the warp and weft yarns of the fabric. This tarpaulin construction cut with ease. In another attempt, the foregoing construction was used except KEVLAR® aramid fibers were substituted for the VECTRAN® fibers, and an urethane resin was substituted for the PVC resin. Again, the resin fixed in place the warp and weft yarns of the fabric. This tarpaulin, also, cut with ease.

SUMMARY OF THE INVENTION

A cut-resistant tarpaulin has a waterproof coating bonded to a cut-resistant woven fabric. The fabric has a leno or gauze weave. The fabric has warp yarns and weft yarns of braided fibers. The fibers have an initial modulus greater than 400 grams per denier.

DESCRIPTION OF THE DRAWINGS

For the purpose of illustrating the invention, there is shown in the drawings a form which is presently preferred; it being understood, however, that this invention is not limited to the precise arrangement and instrumentality shown.

DETAILED DESCRIPTION OF THE INVENTION

Figure 1:
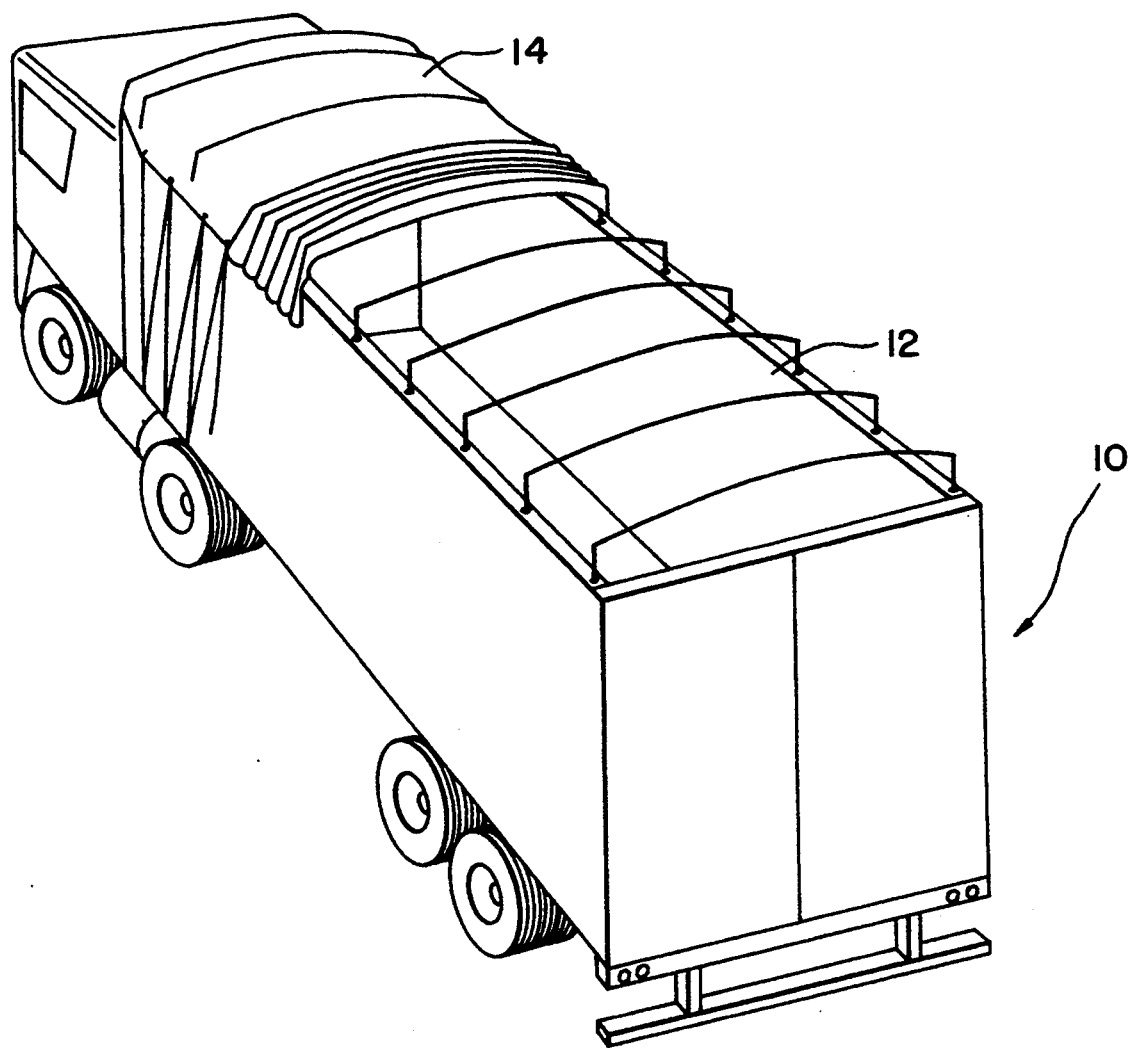
FIG. 1 is a isometric view of a tarpaulin in use on an open-topped truck.

Referring to the figures, wherein like numerals indicate like elements, there is shown in FIG. 1 a truck 10. Truck 10 has an open-topped trailer 12. Tarpaulin 14 is used to cover open-topped trailer 12. The present invention is not limited to the use illustrated in FIG. 1, to the contrary, the inventive tarpaulins maybe used to cover the sides of a truck or objects on a flat bed truck, or any other conventionally known use for tarpaulins or tarpaulin-like materials.

Figure 2:
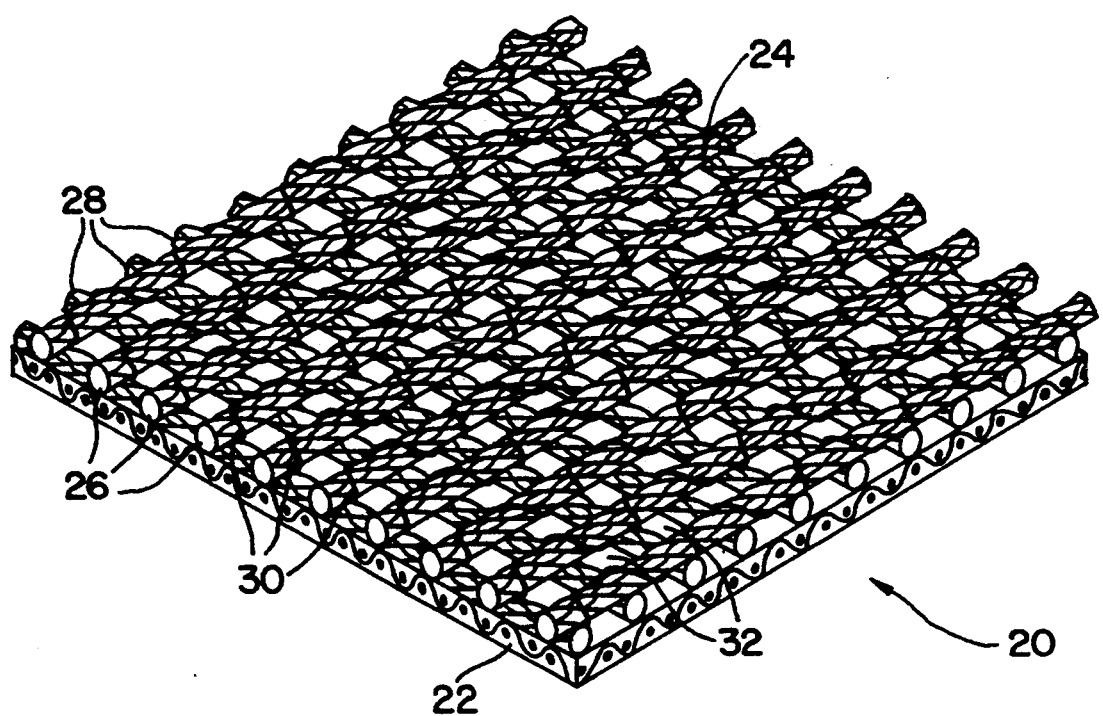
FIG. 2 is a isometric view of a section of the inventive tarpaulin.

Referring to FIG. 2, there is shown a cut-resistant tarpaulin 20. Tarpaulin 20 generally comprises a waterproof coating 22 and a cut-resistant woven fabric 24. Waterproof coating 22 is bonded to woven fabric 24. The bonding of the fabric 24 to coating 22 is critical to the performance of the cut-resistant tarpaulin. The fabric 24, or part of the fabric 24, must be free to float or to move in relation to the coating 22. For example, waterproof coating 22 and cut-resistant woven fabric 24 maybe bonded together by a stitch, i.e. a plurality of stitches which join together fabric 24 and coating 22. Alternatively, coating 22 and fabric 24 maybe adhered to one another, e.g. via use of a polyester film (e.g. MYLAR® Film), so that only a part of fabric 24 is fixed to coating 22, and the remaining part of fabric 24 is free to float or to move in relation to coating 22.

Waterproof coating 22 is any known material which can form a continuous water repellent barrier. For example, coating 22 maybe a resin impregnated fabric. A preferred waterproof coating 22 is "ISOPLAN TM" Heavy Duty Trucking Fabric commercially from Hoechst Celanese Corporation, Charlotte, N.C. ISOPLAN TM fabric is a polyvinyl chloride (PVC) resin coated woven polyester fabric. ISOPLAN TM P3, P2, or P1 maybe used in this tarpaulin. Alternatively, coating 22 maybe a polyurethane resin or PVC resin sheet material.

The cut-resistant woven fabric 24 has a leno or gauze weave. Fabric 24 comprises warp yarns 26 and weft yarns 28. Each yarn is made from fibers having a modulus greater than 400 grams per denier.

The leno or gauze weaves are well known. For example, see: Corbman, B. P., *Textiles: Fiber to Fabric*, Sixth Edition, McGraw-Hill Inc., NYC, N.Y., 1983, pp. 94–95; *Dictionary of Fiber and Textile Technology*, Hoechst Celanese Corporation, Charlotte, N.C., 1980, p. 88; Pizzuto, J. J., *Fabric Science*, Fairchild Publications Inc., NYC, N.Y., 1946, pp. 319, 343–344, 636, 638, each is incorporated herein by reference.

Referring to FIG. 2, a preferred embodiment of the weave is illustrated. Warp yarns 26 overlay weft yarns 28. Anchor yarns 30 interlock warp yarns 26 and weft yarns 28. In this specific embodiment, the weft yarns 28 are bonded to waterproof coating 22, and warp yarns 26 are free to float or to move in relation to coating 22.

The weave is open meaning that there is space 32 between the adjacent warp yarns and adjacent weft yarns. The area of these spaces is selected so that it is small enough to prevent object removal by slipping the protected object through the space, yet it should not be so small that the tarpaulin is too costly or the yarns of the woven fabric 24 can not float or move in relation to coating 22. Space 32 may be about one-half inch square, for example.

Warp yarns 26 and weft yarns 28 are preferably made from braided fibers, but any rope construction maybe used. Rope construction, such as "three-strand twisted", "four-strand twisted", "cable-lay", and "braided", are well known. For example, see: *Samson Rope Manual No. 3-83*, Samson Ocean Systems, Inc., Boston, Mass., 1982; Corbman, B. P., *Textiles: Fiber to Fabric*, Sixth Edition, McGraw-Hill, Inc., NYC, N.Y., 1983, pp. 144–145, each incorporated herein by reference. The braided fibers maybe 6, 8, or 12 "carrier" or "end" braided constructions, 8 ends being preferred. The braided fiber maybe of any diameter, but for most applications the lower limit is about 0.05 mm and the upper limit is dictated by economic considerations, e.g. material costs. Preferably, the braided fiber may have a diameter of about 1.4 mm.

The fibers used to construct warp yarns 26 and weft yarns 28 have an initial modulus of about 400 grams per denier or greater as determined by ASTM D885 (at a strain rate of 50%, a gauge length of 20 inches, and with 3 turns per inch (tpi)). Fibers which meet or exceed the initial modulus criteria maybe selected from the group consisting of: liquid crystalline polymer fibers; high molecular weight polyethylene fibers; aramid fibers. There are several commercially available synthetic fibers which meet the foregoing criteria; they are: VECTRAN ® liquid crystalline polymer fibers from Hoechst Celanese Corporation, Charlotte N.C.; CERTRAN TM high molecular weight polyethylene fibers from Hoechst Celanese Corporation, Charlotte, N.C.; KEVLAR ® aramid fibers from E.I. duPont de Nemours & Co., Wilmington, DE; SPECTRA ® high molecular weight polyethylene fibers from AlliedSignal Corporation, Petersburg, Va.; TECHNOR TM aramid fibers from Teijin Ltd., Osaka, Japan. The preferred fiber is a 1500 denier VECTRAN ® HS liquid crystalline polymer fiber. While single fiber yarns are preferred, composite yarns maybe used.

The present invention may be embodied in other specific forms without departing from the spirit or essential attributes thereof and, accordingly, reference should be made to the appended claims, rather than to the foregoing specification, as indicating the scope of the invention.

We claim:

1. A cut-resistant tarpaulin comprising:
   a water-proof coating bonded to a cut-resistant woven fabric, said bond between said coating and said fabric being adapted to allow said fabric to float or to move in relation to said coating; said fabric having a leno or gauze weave; said fabric having warp yarns and weft yarns of braided fibers; said fibers having an initial modulus greater than 400 grams per denier.

2. The cut-resistant tarpaulin according to claim 1 wherein said bond comprises a stitch.

3. The cut-resistant tarpaulin according to claim 1 wherein said coating comprises a resin impregnated fabric.

4. The cut-resistant tarpaulin according to claim 1 wherein said weft yarns are bonded to said coating.

5. The cut-resistant tarpaulin according to claim 1 wherein said fibers being selected from the group consisting of: liquid crystalline polymer fibers; high molecular weight polyethylene fibers; aramid fibers.

6. A cut-resistant tarpaulin comprising:
   a waterproof coating bonded to a cut-resistant woven fabric, said bond between said coating and said fabric being adapted to allow said fabric to float or to move in relation to said coating, said fabric having a leno or gauze weave, said fabric having warp yarns and weft yarns of braided fibers, said fibers having an initial modulus greater than 400 grams per denier, said fibers being selected from the group consisting of: liquid crystalline polymer fibers; high molecular weight polyethylene fibers; aramid fibers.

* * * * *